(12) United States Patent
Steuer

(10) Patent No.: US 6,988,973 B2
(45) Date of Patent: Jan. 24, 2006

(54) TRANSMISSION DEVICE FOR INTRODUCING A SHIFT MOVEMENT INTO A BICYCLE INTERNAL GEAR HUB

(75) Inventor: Werner Steuer, Schweinfurt (DE)

(73) Assignee: SRAM Deutschland GmbH, Schweinfurt (DE)

( * ) Notice: Subject to any disclaimer, the term of this patent is extended or adjusted under 35 U.S.C. 154(b) by 25 days.

(21) Appl. No.: 10/063,355

(22) Filed: Apr. 15, 2002

(65) Prior Publication Data

US 2002/0151404 A1 Oct. 17, 2002

(30) Foreign Application Priority Data

Apr. 14, 2001 (DE) .......................... 101 18 645

(51) Int. Cl.
*F16H 37/06* (2006.01)
*B62K 25/02* (2006.01)

(52) U.S. Cl. ..................................... 475/329; 74/473.14
(58) Field of Classification Search ................. 475/269, 475/270, 296, 329; 74/473.1, 473.13, 473.14, 74/473.3

See application file for complete search history.

(56) References Cited

U.S. PATENT DOCUMENTS

| 2,854,108 | A | | 9/1958 | Douglas | |
|---|---|---|---|---|---|
| 3,934,493 | A | | 1/1976 | Hillyer | ........................ 74/750 |
| 5,078,664 | A | * | 1/1992 | Nagano | ....................... 475/297 |
| 5,322,487 | A | | 6/1994 | Nagano | |
| 5,863,270 | A | | 1/1999 | Chen et al. | |
| 5,964,678 | A | * | 10/1999 | Hanada et al. | ............... 475/297 |
| 6,039,671 | A | * | 3/2000 | Keller | ......................... 475/296 |
| 6,213,910 | B1 | * | 4/2001 | Matsuo et al. | ............... 475/297 |
| 6,267,704 | B1 | * | 7/2001 | Patterson et al. | ............ 475/298 |
| 6,312,355 | B1 | * | 11/2001 | Nishimoto | ................. 475/289 |
| 6,527,089 | B2 | * | 3/2003 | Lumpkin et al. | .............. 188/26 |
| 6,572,508 | B2 | * | 6/2003 | Shoge | ......................... 475/324 |

FOREIGN PATENT DOCUMENTS

| CH | 246 165 A | 12/1946 |
|---|---|---|
| DE | 24 58 871 | 6/1975 |
| DE | 24 58 871 A | 6/1975 |
| EP | 0 383 350 A2 | 8/1990 |
| EP | 350 791 B1 | 11/1994 |
| EP | 383 350 B1 | 6/1995 |
| EP | 0 658 475 A1 | 6/1995 |
| EP | 0 834 685 A2 | 4/1998 |
| GB | 2 249 364 A | 5/1992 |

* cited by examiner

*Primary Examiner*—Roger Pang
(74) *Attorney, Agent, or Firm*—Milan Milosevic; Lisa Wunderlich

(57) ABSTRACT

A multi-speed gear hub that includes a hub shaft, a hub sleeve mounted about the hub shaft and at least one planetary gear mechanism for providing a plurality of transmission paths. A bearing is mounted about the hub shaft such that an annular gap is created between the bearing and the hub shaft. A transmission sleeve is disposed in an annular gap for introducing a rotational shift movement into the interior of the gear hub. The configuration of the transmission element does not limit the rotation of the transmission and thus the shifting travel or the shifting angle for each gear ratio is not limited.

24 Claims, 2 Drawing Sheets

TRANSMISSION DEVICE FOR INTRODUCING A SHIFT MOVEMENT INTO A BICYCLE INTERNAL GEAR HUB

BACKGROUND OF INVENTION

This invention relates to a transmission device for a bicycle internal gear hub and more particularly a transmission device for introducing a rotational shift movement into a internal gear hub.

A multi-speed internal gear hub includes at least one planetary gear mechanism that is arranged around a stationary hub shaft. Torque is transferred via a sprocket to a driver and further via one of the several transmission paths of the planetary gear mechanism to a hub sleeve. A particular transmission path is selected by components of a gearing system being rotating or displaced relative to the hub shaft. Gear selection is accomplished via a shifter located on or near the handlebars and is transmitted mechanically via a sheath cable or statically (e.g. electrically) to the multi-speed hub. A shift movement may be introduced into the internal gear hub by a shaft shifting device arranged on one end of the hub shaft. The axial shifting movement corresponds to the selected gear. With static shift transfer, mechanical conversion of the shifting signal is accomplished via an actuator.

Shift movements may be introduced into the internal gear hub linearly, e.g. by means of pushing or pulling elements, or rotationally. The shifting operation is generally guided from outside into the interior of the hub by means of a vertical component.

EP 0350791 discloses an introduction of a linear shift movement into the internal gear hub. Speed change members are located within the hub shaft and are in control connection with a gear system of the hub. The speed change members are either pushed inwards of a bore of the hub shaft or moved outwards under the action of biasing members. Each of the speed change members have a respective end portion adjacent one end of the hub shaft and thereby increases the axial dimension. This axial structure is sometimes felt to be troublesome, and should be minimized or eliminated.

Introduction of a rotational shift movement into the gear hub may be accomplished coaxially of the hub shaft and outside of the hub shaft. The rotary movement is directed into the interior of the hub via a rotating component mounted at both ends, or by means of a rotatable sleeve that engages fingers axially through cutouts in a control element.

An example of a rotational shift movement is disclosed in DE 24 58 871. The linear shifting movement is converted into a rotary movement by a cable spool and is transferred coaxially between two roller bearings into the interior of the hub. A disadvantage of this configuration is that the introduction and transfer of the rotational shifting movement is very complex. It is very complex because the rotating components lie in the power flow between the hub sleeve and the hub shaft and must transfer all the bearing forces as well as the forces resulting from brake actuation.

Another example of rotational shifting movement is disclosed in EP 0 383 350. The rotary motion of the cable spool is directed into the interior of the hub through cutouts of a control member rotatably mounted on the outer periphery of the hub shaft. This configuration only allows a limited rotation angle of the control member, thereby unfavorably limiting the shifting travel or shifting angle for each gear ratio. This results in unfavorable transfer conditions requiring large angles of inclination at sloped surfaces to transmit the shifting motion.

There is a need for a simple device that introduces a shift movement into the internal gear hub. An apparatus that eliminates the need for an extended axial width due to a shaft shifting device or complex implementation using bearing-mounted components and limitations on the rotation angle in the context of rotational transfer using cutout segments with dimensions predefined by functional factors.

SUMMARY OF INVENTION

The object of the present invention is to provide a shift actuation mechanism that introduces into the internal gear hub a rotationally shift movement with no limitation on rotation angle or linearly through a shaft-mounted equipment. Conversion of the rotational motion into a linear motion necessary for activation of the respective gear ratio path in the planetary gear mechanism is accomplished on the side of a transmission sleeve facing either toward the planetary gear mechanism or toward a cable spool.

The present invention provides a multi-speed gear hub that has a transmission element for introducing a shift movement into the gear hub below an inner ring of a bearing of a drive member. The inner ring is attached to a carrier mounted on a hub shaft such that an annular gap is created between the inner ring of the bearing and the hub shaft. The transmission element is disposed in the annular gap. One end of the transmission element is in working engagement with a cable spool and another end of the transmission element with a gear ratio changing device in the gear hub.

If the transmission element is to transmit a rotational shift movement, the transmission element is impinged upon with a rotary motion in the region of the inner ring via the cable spool or by a gear or toothed rack. If the transmission element is to transmit a linear shifting movement, then the rotary motion of the cable spool is converted at the contact surface with the transmission element into a linear motion. The cable spool has axially extending contours in the region of the inside diameter of the cable spool which are in working engagement with the corresponding end surface of the transmission element. If upon rotation of the cable spool, the axially displaceable transmission element is prevented from rotating along with it, a linear motion of the transmission element then occurs. By means of the transmission element, the shift movement is transmitted through the annular gap between the bearing inner ring and the hub shaft to the gear ratio changing device in the hub.

The carrier radially and axially immobilizes the inner ring and absorbs the bearing forces and is the housing for the cable spool. The bearing inner ring and the carrier may be integral. An opening is disposed on the periphery of the carrier to receive the control cable that is attached to the cable spool. The cable spool has an opening for attaching the control cable to the spool and the spool has a cable groove for winding and unwinding the control cable. The cable spool rotates around the hub shaft and has on one side a guiding surface, located near the hub shaft, to support axial shifting forces that occur on the carrier. To reduce friction, a slip ring may be arranged between the cable spool and the carrier.

The cable spool may have a return spring which is supported either on the carrier or the hub shaft. Upon relaxation of the control cable, the return spring returns the cable spool to an initial position. The return spring may be a coil spring or a torsion spring. The cable spool may be connected to the transmission element via a preloaded resilient coupling member such as a helical spring. If the gear hub is not shiftable at the moment of the planned shifting operation, shifting operations introduced via the cable spool are temporarily stored by the spring until a shiftable position is once against established.

In a further embodiment of the present invention, the rotational transfer of the shift movement to the transmission element may be accomplished by gears or a flexible toothed rack. For example, an input drive gear or a toothed rack engages an output drive gear of the transmission element. A drive input may be provided by an electric motor or mechanically via a shifting cable and a cable spool.

These and other features and advantages of the invention will be more fully understood from the following description of certain embodiments of the invention taken together with the accompanying drawings.

DETAILED DESCRIPTION

Figure 1:
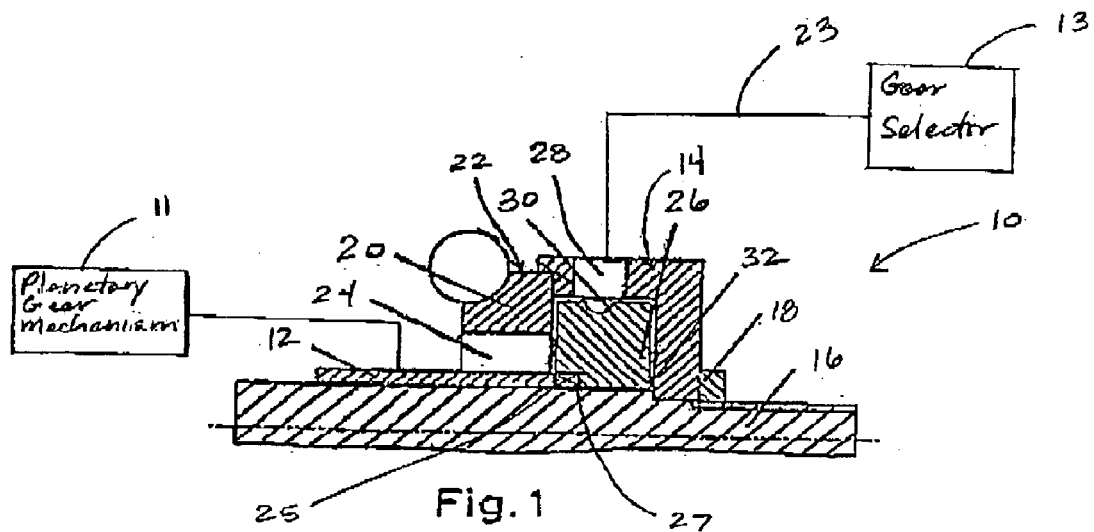
FIG. 1 is a cross-sectional view of a transmission device for a multi-speed gear hub in accordance with one embodiment of the present invention.
Figure 1A:
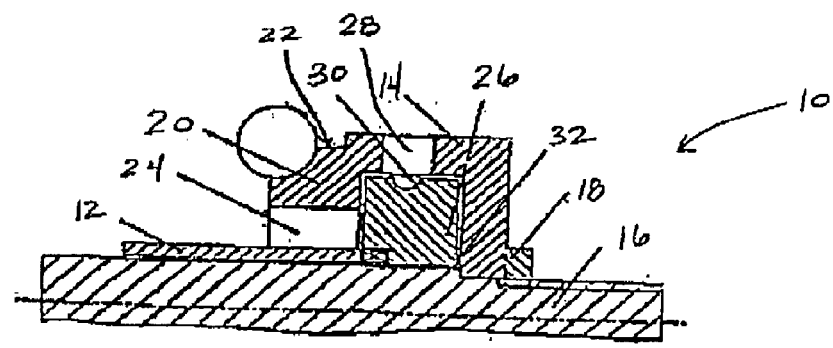
FIG. 1a is a cross-sectional view of a transmission device in accordance with another embodiment of the present invention showing a carrier that is integrated with an inner race.

FIG. 1 shows a view of a transmission device 10 of an internal gear hub and a transmission element 12. The internal gear hub includes a planetary near mechanism 11 that has a plurality of transmission paths. A gear selector 13 or shifter located remotely from the internal gear hub may be operated to select a desired transmission path. The transmission device 10 includes a carrier 14 nonrotatably mounted on a hub shaft 16 with a shaft nut 18. An outer diameter of an inner ring 20 of a roller bearing 22 is received on the carrier 14. Alternatively, the carrier 14 and the inner ring 20 may form one part or are integral. An inside diameter of the inner ring 20 is larger than the outside diameter of the hub shaft 16 to provide an annular opening 24 between the inner ring 20 and the hub shaft 16. The annular gap 24 provides a passage for the transmission element 12. The transmission element 12 may be a transmission sleeve. By the outer diameter of the inner ring 20 being receive on the carrier 14, the inside diameter of the inner ring 20 is unobstructed and creates a small bearing diameter, resulting in a positive effect on cost and installation space. The carrier 14 is a housing for a rotating element or a cable spool 26. The carrier 14 has a cable opening 28 for receiving a control cable 23 having one end attached to the cable spool 26 and another end attached to the gear selector 13. The spool 26 includes a cable groove 30 on an outside diameter of the spool 26 for receiving the control cable 23. The transmission sleeve 12 may be nonrotatably attached to the cable spool 26 or integrally formed with the cable spool 26. For example, the transmission sleeve 12 includes axially extending contours 25 for engaging corresponding contours 27 of the cable spool 26.

Introduction of the shift movement may also be accomplished with a linkage disposed coaxially with the hub shaft. The axial shifting forces that occur are braced against the carrier 14. To reduce friction, an axially elevated guiding surface may be provided in a region of the inside diameter of the cable spool or a slip ring 32 made of low-friction material may be arranged between the cable spool and the carrier 14. This self-supporting configuration of the inner ring 20 creates an unobstructed annular gap 24 resulting in unrestricted transmission of the rotational shift movement.

Figure 2:
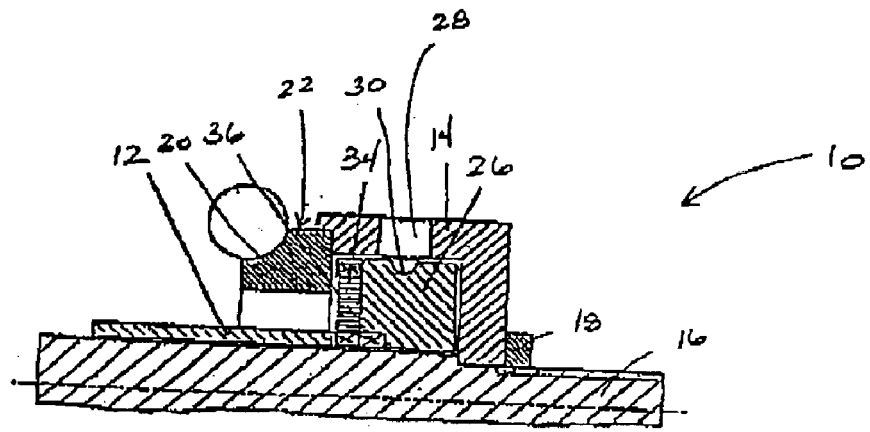
FIG. 2 is a cross-sectional view of the transmission device of FIG. 1 further comprising a resilient coupling member between a cable spool and a transmission sleeve.

FIG. 2 illustrates the same transmission device of 10 FIG. 1 but further includes a resilient coupling member 32 between the cable spool 26 and transmission sleeve 12. The resilient coupling member 34 may be a helical spring or a torsion spring. The spring 34 is attached internally against the transmission sleeve 14 and externally against the cable spool 26. The spring 34 is preloaded by a rotational stop 36 of the cable spool 26. If the shift movement cannot be transmitted immediately because the gear hub is in unfavorable position, the previously preloaded spring 34 is then additionally tensioned and thus stores the shifting operation. When a favorable shift position of the gear hub exists, the preloaded spring 34 immediately introduces the shifting operation in the winding direction of the cable spool 26 and rotates the transmission sleeve 12.

Figure 3:
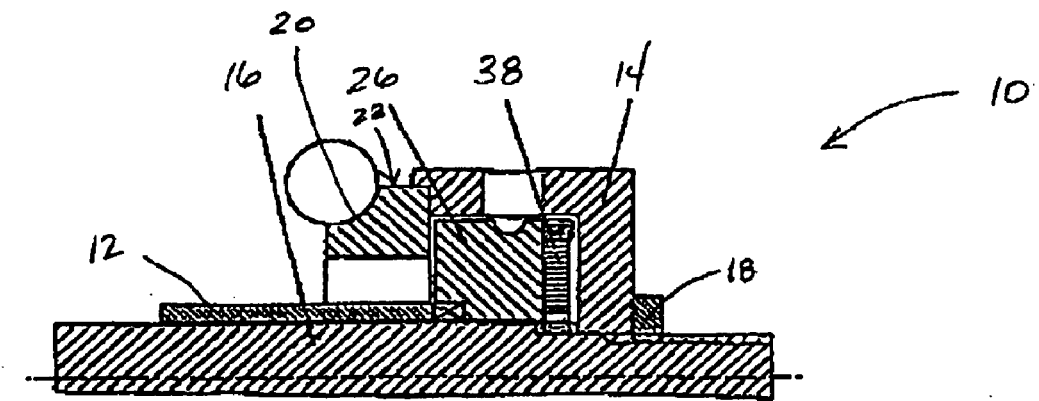
FIG. 3 is a cross-sectional view of the transmission device of FIG. 1 further comprising a return spring.

In FIG. 3, the transmission device of FIG. 1 further includes a return spring 38. One end of the spring is nonrotatably attached to the cable spool 26 and another end is attached to the hub shaft 16 or to the carrier 14. Preferably, the return spring 38 is preloaded and the rotation range of the cable spool 26 is limited so that the cable spool 26 may be brought into a defined initial position upon relaxation of the cable tension or if the control cable is unhooked. Another advantage of the return spring 38 is that is stores the shifting operation in winding direction of the control cable when the gear hub is not in the proper position to be shifted. In a preferred embodiment of the present invention, both the spring 34 between the cable spool 26 and transmission sleeve 12 and the return spring 38 between the spool 26 and the hub shaft 16 or carrier 14 are provided. Thus the shifting operations in both the winding and unwinding directions may be stored. Both springs 34, 38 may be integrated laterally into the outer contour of the cable spool 26.

Figures 4, 5:
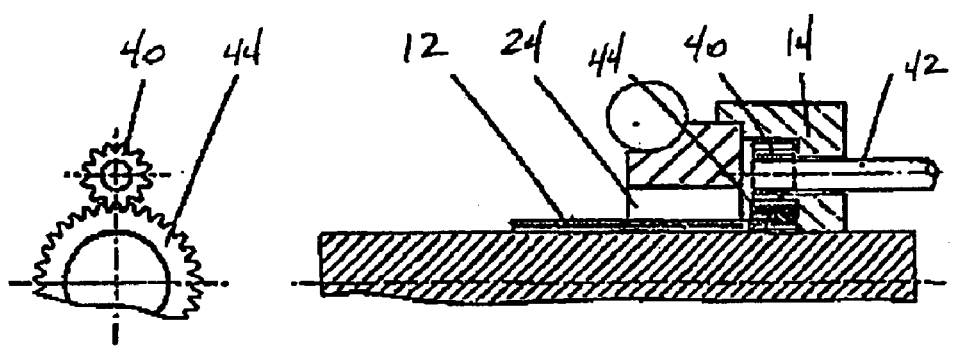
FIG. 4 is a cross-sectional view of a transmission device for a multi-speed gear hub in accordance with another embodiment of the present invention.
FIG. 5 is a front view of gears in the transmission device of FIG. 4.

Referring now to FIGS. 4 and 5, the shift operation may be performed by gears. As input drive gear 40 is rotated in accordance with the shift travel, e.g. by the cable spool or by a motor-driven shaft 42 that is guided laterally by the carrier 14. The rotary movement is transmitted to an output drive gear 44 that is joined nonrotatably to the transmission sleeve 12. The input drive gear 40 may also be a toothed rack. This configuration of the gear hub allows the use of gear ratios. For example, a large rotation angle with a correspondingly low shifting force at the input drive gear 40 is converted by the output drive gear 44 into a small rotation angle with a high shifting force, and transmitted by the transmission sleeve 12 through the annular gap 24 into the interior of the hub 10.

While this invention has been described by reference to several preferred embodiments, it should be understood that numerous changes could be made within the spirit and scope of the inventive concepts described. Accordingly, it is intended that the invention not be limited to the disclosed embodiments, but that it have the fully scope permitted by the language of the following claims.

What is claimed is:

1. A transmission device for a multi-speed gear hub for a bicycle having a hub shaft, a hub sleeve mounted about the hub shaft and at least one planetary gear mechanism for providing a plurality of transmission paths, the transmission mechanism comprising:
   a bearing mounted about the hub shaft, the bearing having an inner ring;
   a carrier nonrotatably mounted about the hub shaft, the carrier axially and radially holding the inner ring; and
   a transmission element for transmitting a rotational shift movement into the interior of the hub, the transmission element mounted about the hub shaft between the bearing and the hub shaft such that an annular gap is provided and maintained between the bearing and the hub shaft to permit the transmission element to rotate 360°.

2. A transmission device as claimed as claim 1 wherein an outer diameter of the inner ring of the bearing is held by the carrier.

3. A transmission device as claimed in claim 1 wherein the inner ring of the bearing and the carrier are integral.

4. A transmission device as claimed in claim 1 wherein the carrier houses a cable spool.

5. A transmission device as claimed in claim 1 wherein the carrier houses a gear mechanism having at least one input drive gear and at least one output drive gear.

6. A transmission device as claimed in claim 4 wherein the cable spool includes a cable groove on the periphery of the spool for winding and unwinding the control cable.

7. A transmission device as claimed in claim 4 wherein the cable spool includes a guiding surface adjacent the hub shaft for reducing friction between the cable spool and the carrier.

8. A transmission device as claimed in claim 4 further comprises a slip ring disposed between the cable spool and the carrier to reduce friction between the cable spool and the carrier.

9. A transmission device an claimed in claim 1 wherein the carrier has at least one opening provided on periphery of the carrier for passage of a control cable.

10. A transmission device as claimed in claim 5 wherein the carrier has at least one opening on the circumference of the carrier, the opening running coaxially with respect to the hub shaft for receiving the gear mechanism.

11. A transmission device as claimed in claim 5 wherein the carrier has at least one opening in an outward-facing side wall of the carrier, the opening running coaxially with respect to the hub shaft for receiving the gear mechanism.

12. A transmission device as claimed in claim 1 wherein the transmission element is a transmission sleeve nonrotatably attached to a cable spool such that conversion of the rotational shift movement into to a linear shift movement takes place inside the gear hub.

13. A transmission device as claimed in claim 1 wherein the transmission element is a transmission sleeve nonrotatably attached to a gear mechanism having an input drive tooth set and an output drive gear, the output drive gear driven by the input drive tooth set, the input drive tooth set is one of a gear and a toothed rack.

14. A transmission device as claimed in claim 13 wherein the input drive gear is driven by one of a cable spool and an electrical drive.

15. A transmission device as claimed in claim 4 further comprises a resilient coupling member connecting the cable spool to the transmission element, the resilient coupling member storing the shift travel and the shift energy.

16. A transmission device as claimed in claim 15 wherein the resilient coupling member is a coil spring loaded when the multi-speed bicycle hub is not ready for shifting.

17. A transmission device as claimed in claim 4 further comprising a return spring for returning the cable spool to an initial position, the return spring is supported on one of the hub shaft and the carrier.

18. A transmission device as claimed in claim 17 wherein the return spring is disposed in a contour of the cable spool and is one of a coil spring and a torsion spring.

19. A transmission device as claimed in claim 17 wherein the return spring is arranged laterally and is one of a coil spring and a torsion spring.

20. A transmission device as claimed in claim 13 wherein the toothed rack includes a recovery spring for returning the transmission sleeve to an initial position opposite the actuation direction, the recovery spring supported on one of the carrier and the hub shaft.

21. A transmission device as claimed in claim 1 further comprises a spring for biasing the transmission element into an initial position.

22. A transmission device as claimed in claim 4 wherein the transmission element includes axially extending contours for engaging corresponding contours of the cable spool, the transmission element axially displaceable and rotationally fixed.

23. A transmission device for a multi-speed gear hub for a bicycle having a hub axle, a hub sleeve rotatably mounted about the hub axle and at least one planetary gear mechanism for providing a plurality of transmission paths, the transmission mechanism comprising:
   a gear selector for selecting the desired transmission paths;
   a bearing mounted about the hub axle, the bearing having an inner race;
   a transmission element for introducing a rotational shift movement into the multi-speed bicycle hub, the transmission element mounted about the hub shaft between the bearing and the hub shall such that an annular gap is provided and maintained between the bearing and the hub shaft to permit the transmission element to rotate 360°;
   a rotating element for converting a linear movement of a control cable connected to the gear selector into the rotational shift movement; and
   a carrier nonrotatably mounted on the hub shaft, the carrier enclosing the rotating element, the carrier axially and radially holding the inner race.

24. A transmission device as claimed in claim 23 wherein the transmission element has axially extending contours for engaging corresponding contours of the rotating element, the transmission element axially displaceable and rotationally fixed.

* * * * *